Feb. 19, 1952  C. E. CREDE  2,586,307
SEISMIC FRAME STRUCTURE
Filed July 21, 1949
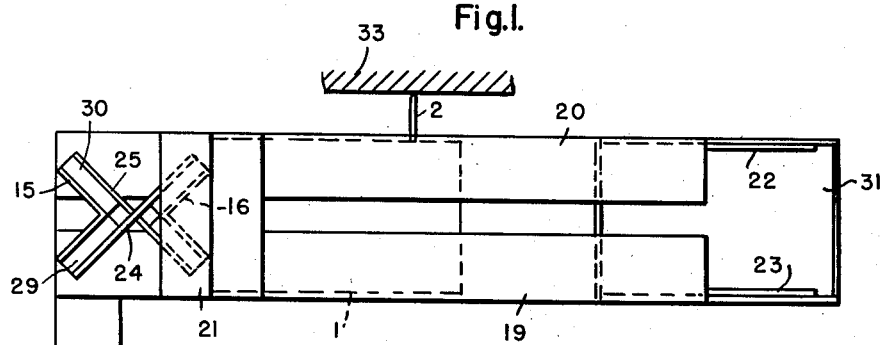
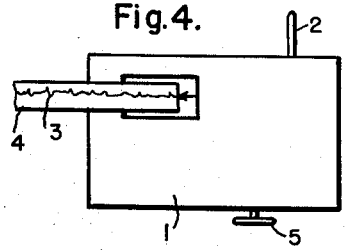
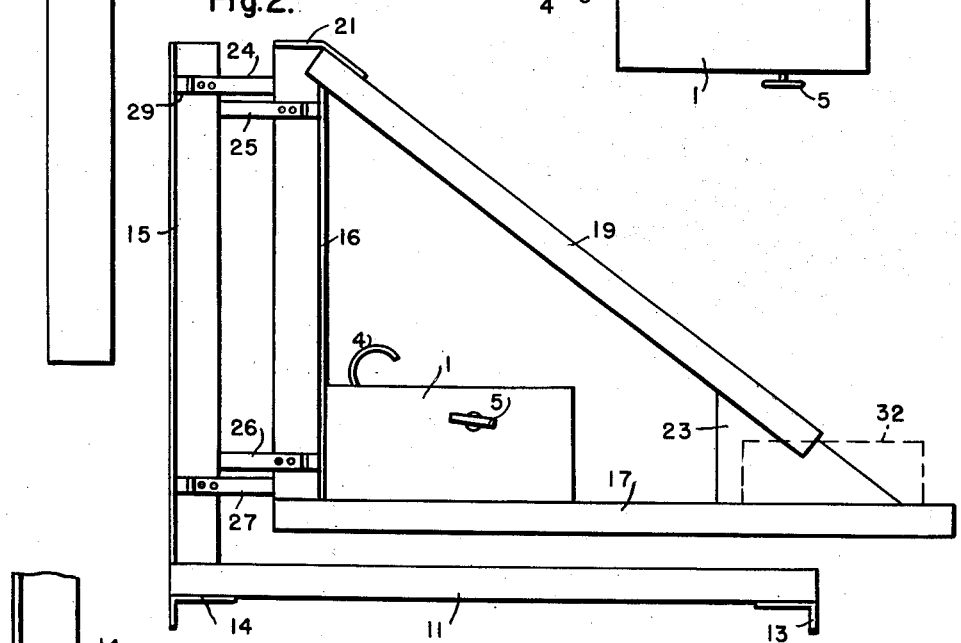
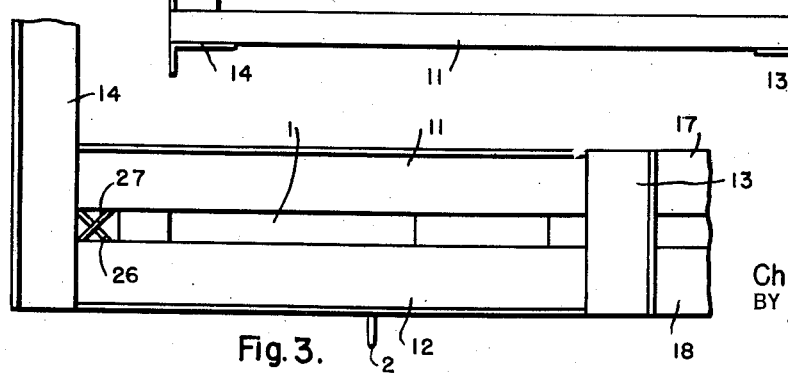
INVENTOR
Charles E. Crede.
BY
ATTORNEY Patented Feb. 19, 1952

2,586,307

UNITED STATES PATENT OFFICE 2,586,307

SEISMIC FRAME STRUCTURE

Charles E. Crede, Winchester, Mass., assignor to The Barry Corporation, Cambridge, Mass., a corporation of Massachusetts Application July 21, 1949, Serial No. 105,945

2 Claims. (Cl. 346—7)

My invention relates to apparatus of the seismograph type for indicating and measuring vibrations of building walls, bridges, and the like large structures.

Providing an industrially suitable apparatus for such purposes involves problems of considerable difficulty. A swaying building, for instance, moves in its entirety so that there is no stationary reference within the building from which to measure. The frequency is generally low, as low as two cycles per second, and a seismic element to be useful under these conditions requires a natural frequency of one cycle per second or less. The excursion is low, even though it often seems high to the senses, and an instrument of fairly high sensitivity is required.

Most of the known vibration recording apparatus suitable under the just-mentioned conditions are too heavy and cumbersome for industrial purposes or require an outside power source and thus cannot feasibly be built as portable or ambulatory devices. A portable vibrograph for industrial application is known, for instance, from Patent No. 2,393,069 of F. C. Rushing. However, in the absence of a sufficiently steady support, such portable vibrographs do not produce a satisfactory vibration record at frequencies below ten cycles per second, i. e. they cannot be applied to observations in swaying buildings and the like slow-moving structures if used in the ordinary manner. It seems possible, of course, to mount such a portable vibrograph on a seismic suspension. With a conventional suspension, however, several hundred pounds would have to be added to the vibrograph in order to obtain the desired low natural frequency and this would obviate the advantages of portability and excessively increase the cost of the equipment.

It is therefore an object of my invention to provide portable seismographic equipment of simple design suitable for use in industry, especially for the above-mentioned purposes; and it is a more specific object of the invention to provide a device that, in conjunction with a portable vibrograph of the type mentioned, affords utilizing such a vibrograph for the recording of vibrations below ten cycles per second.

To this end, and in accordance with a feature of my invention, I provide a spring-biased, pendulous arm whose pivot axis extends in a vertical plane so that the forces of gravity have no appreciable effect on the pendulous oscillations, and I place a pendulum weight near the end of the arm and support the vibrograph proper on the arm between the weight and the pivot axis. As a result, the stabilizing effect of the mass is multiplied by a lever arm so that its effective magnitude is increased. According to a more specific feature of the invention, the arm structure is hinged to a vertical column of a rigid support by means of frictionless elastic hinges and has a supporting surface for a separate vibrograph located close to the hinge axis while a surface or pan to be weighted is located near the free end of the arm structure.

The drawing exemplifies an embodiment of the invention by a top view in Fig. 1, a side view in Fig. 2, and a bottom view in Fig. 3, while Fig. 4 shows a schematic top view of a known vibrograph to be used in conjunction with the frame structure of Figs. 1 to 3.

Before describing the illustrated frame structure according to the invention, a brief reference appears proper to a vibrograph applicable in conjunction with the frame structure. Such a vibrograph is shown at 1 in the drawing. Its box-shaped housing encloses a recording mechanism which is actuated by an axially movable and spring-biased prod 2 that projects from within the housing to the outside and, during the performance, is in contact with the object whose vibration is to be measured. The stylus of the recording mechanism produces a curve 3 of the vibration on a recording tape 4. During the operation, the tape 4 is moved out of the vibrograph housing by a spring-actuated tape transport device wound up by means of a key 5. Further details of the vibrograph need not be described because they are not essential to the invention proper and are known as such from the above-mentioned patent.

The device according to the invention proper has a rigid base composed of structural members 11, 12, 13, 14, for instance, of aluminum. Rigidly attached to this base 11 is a vertical column consisting of an angular member 15. The position of member 15 relative to the base is such that the cross-sectional angle is halved by the center line between base members 11 and 12, the point of the angle being directed toward the location of part 13.

Hinged to column 15 is a pendulous arm structure composed of structural members 16, 17, 18, 19, 20 and connecting plates 21, 22, 23 which are rigidly fastened together. The angle edge of member 16 faces that of the column member 15. Two pairs of crossed leaf springs 24, 25 and 26, 27 connect the column member 15 with the pendulous arm structure. Spacers 29, 30 are interposed between respective leaf springs 24, 25 and column 15, and similar spacers are disposed between these leaf springs and angle member 16 and also between the leaf springs 26, 27 and the two angle members 15, 16 to which the springs are rigidly attached. As a result, the cross point of each pair of springs is sufficiently spaced from the angle members to secure the desired hinging and flexibility. Flexible cross hinges of this type confine the movements of the arm structure relative to the column 15 to a rocking oscillation about a common axis determined by the crossing points of the two pairs of flat springs. Within the available range of hinge movement, these hinges are free of friction. Their elastic tendency is to hold the arm structure in the illustrated center position relative to the base.

The two member 17, 18 at the bottom of the arm structure form a supporting surface, close to the hinge axis, for the vibrograph 1. The other ends of members 17, 18 carry attached thereto a pan 31 for the reception of a large mass or weight as shown by dotted lines at 32 in Fig. 2.

For operating the device, the frame structure equipped with a vibrograph and a weight, is set up close to the building wall or structure 33 whose vibrations are to be measured, so that the prod 2 is in contact with the structure. The mass weight 32 is selected so that the natural frequency of the pendulous arm structure, including vibrograph and weight, is substantially lower than the frequency to be measured. The vibrations of the structure under observation cause prod 2 to oscillate relative to the vibrograph housing. As a result, a wave is recorded on the tape 4. This record is to be evaluated as follows. It is apparent that the rigid base of the frame structure moves with the building whose vibration is being measured, whereas the mass 32 remains essentially stationary in space because of its seismic properties. The vibrograph 1 is positioned about midway between these extremes and consequently moves, but with a lower amplitude than the amplitude of the building. Thus, the record of the vibrograph tape represents the relative motion between the vibrograph and the building. This is less than the actual motion of the building and must be multiplied by a calibration factor which depends upon the frequency of the vibration being measured. Consequently, a device according to the invention equipped with a vibrograph must be calibrated and, once the calibration curve (frequency of vibration versus calibration factor) is available, permits determining the actual vibration movement by multiplying the vibrograph reading times the calibration factor. For instance, a commercial device built in accordance with the example illustrated in the drawings and equipped with a vibrograph as shown in the above-mentioned patent has a calibration factor of about 1.5 at a frequency of two cycles per second, about 2.5 at four cycles per second, about 2.7 at six cycles per second, and about 2.8 at eight to ten cycles per second.

Devices according to the invention, by virtue of their compactness, simplicity and portability, can readily be used for analyzing vibration problems on various machinery or structures where no steady reference point is available. Such devices also offer the advantage that a vibrograph can be used down to lowest frequencies, thus obviating the necessity of using a different seismograph for the lower frequency range.

It will be obvious that the design of devices according to the invention can be modified and altered in various respects, for instance by using other structural elements or materials than the above-mentioned angle members, without departing from the objects and gist of the invention and within the scope of its essential features set forth in the claims annexed hereto.

I claim as my invention:

1. A frame structure for a vibrograph, comprising a base, a column projecting from said base and being rigidly attached thereto, a pendulous arm structure having a member parallel to said coulmn, crossed leaf spring hinge means connecting said member with said column to confine said arm structure to pivotal movement about a fixed hinge axis, said arm structure having a vibrograph-supporting surface close to the hinge axis and having a weight-receiving surface remote from said axis.

2. A frame structure for a vibrograph, comprising a horizontal base, a vertical angle member rigidly secured at one end of said base and having an angle member facing the other end of said base, a pendulous arm structure having a vertical angle member with an angle edge facing that of said first angle member, two pairs of crossed leaf spring hinges vertically spaced from each other and interconnecting said two angle members, said arm structure having a weight-receiving surface remote from said axis and having a vibrograph-supporting surface between the hinge axis and said weight-receiving surface.

CHARLES E. CREDE.

REFERENCES CITED

The following references are of record in the file of this patent:

UNITED STATES PATENTS

| Number | Name | Date |
|---|---|---|
| 189,833 | Bates | Apr. 24, 1877 |
| 2,317,097 | Eksergian | Apr. 20, 1943 |
| 2,393,069 | Rushing et al. | Jan. 15, 1946 |
| 2,441,162 | McPherson | May 11, 1948 |